G. L. MASON.
TRUCK.
APPLICATION FILED OCT. 5, 1917.
Reissued Dec. 4, 1917.
14,404.
2 SHEETS—SHEET 1.
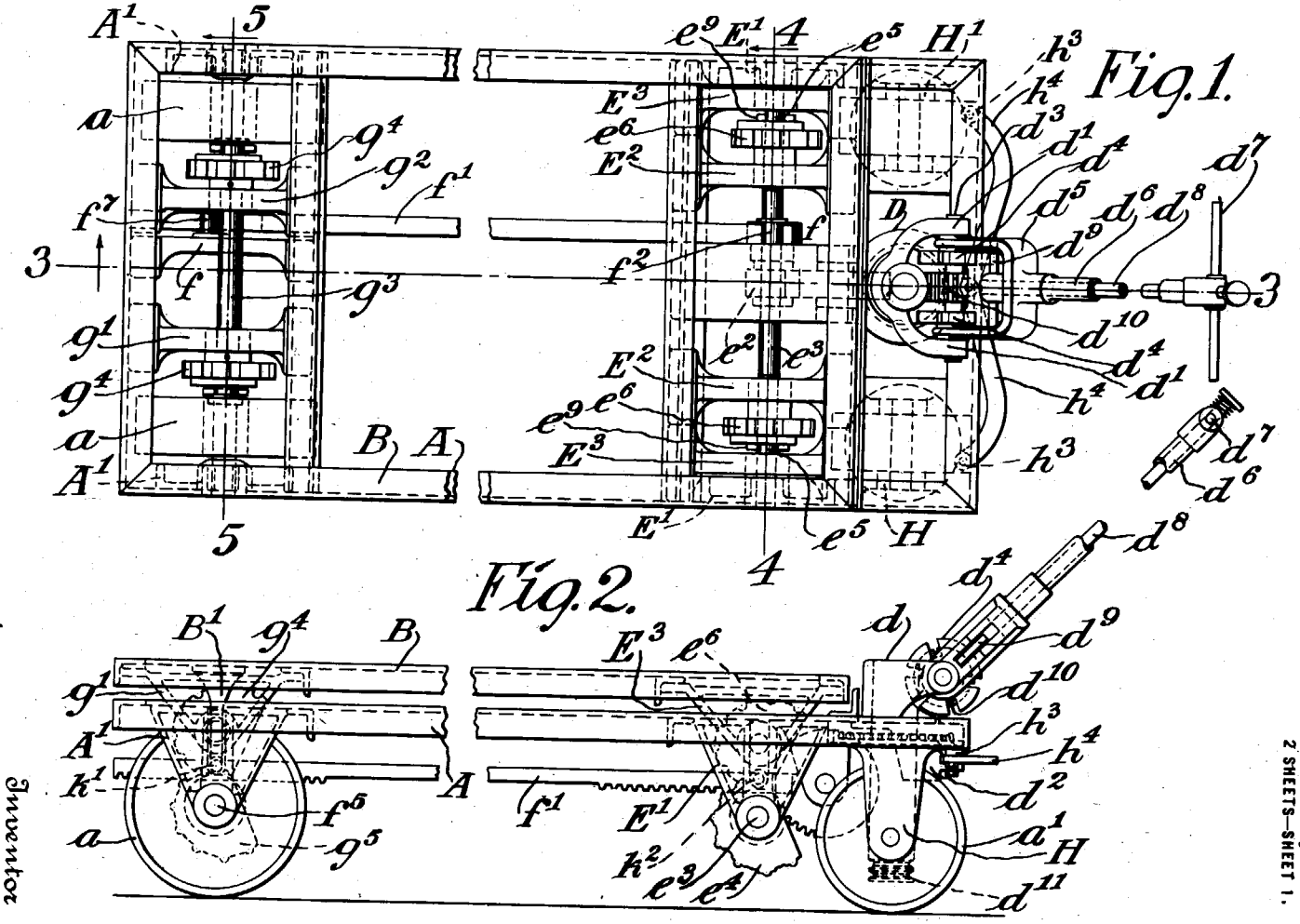
Inventor
George L. Mason
By Newell & Neal
Attorneys G. L. MASON.
TRUCK.
APPLICATION FILED OCT. 5, 1917.
Reissued Dec. 4, 1917.
14,404.
2 SHEETS—SHEET 2.
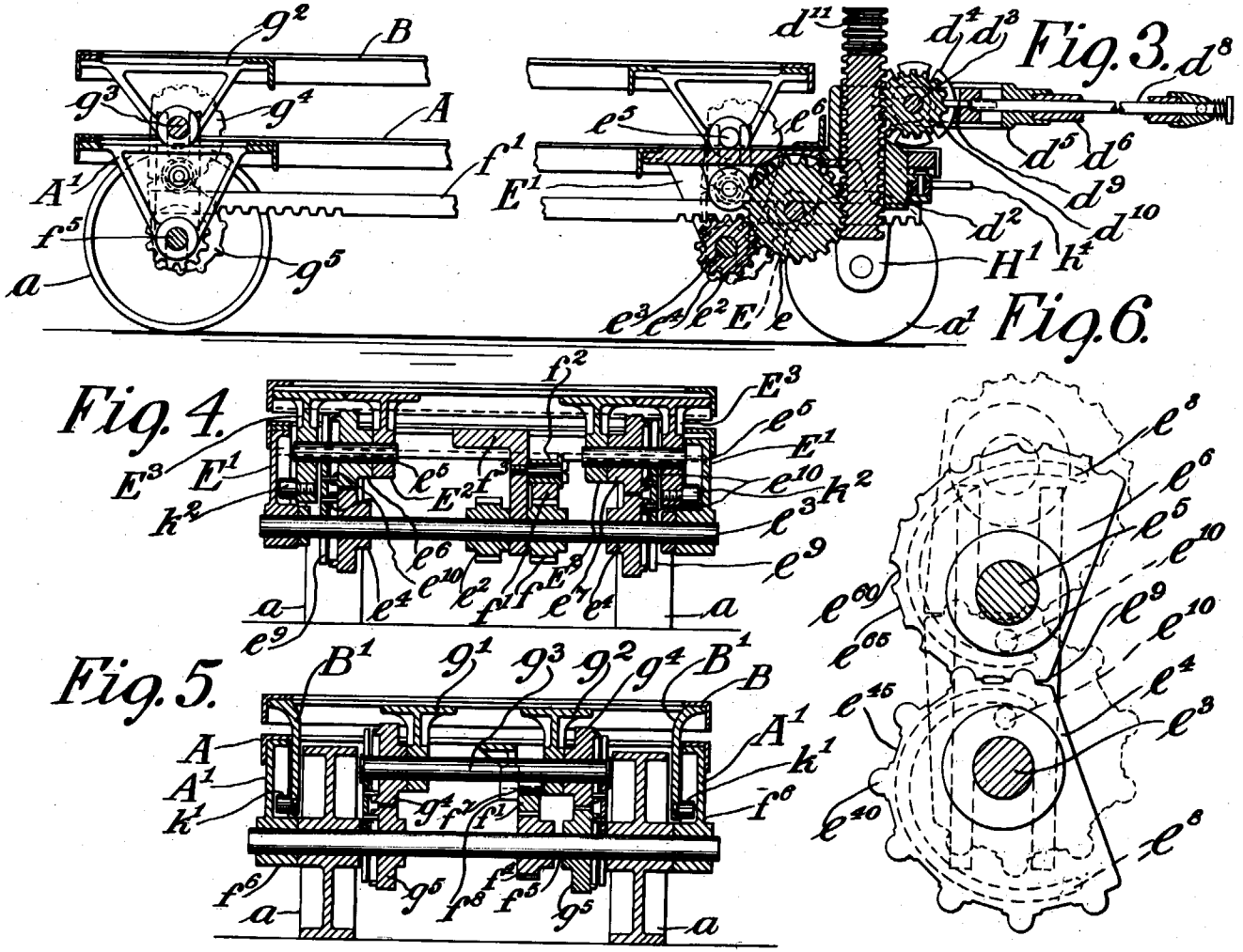
Inventor
George L. Mason
By Newell & Neal
Attorneys

UNITED STATES PATENT OFFICE.

GEORGE L. MASON, OF WAREHOUSE POINT, CONNECTICUT, ASSIGNOR, BY MESNE ASSIGNMENTS, TO HERBERT W. COWAN, J. LEWIS WYCKOFF, AND EDWARD N. WHITE, TRUSTEES, ALL OF HOLYOKE, MASSACHUSETTS, DOING BUSINESS AS COWAN TRUCK COMPANY.

TRUCK.

14,404. Specification of Reissued Letters Patent. Reissued Dec. 4, 1917.

Original No. 1,176,684, dated March 21, 1916, Serial No. 768,912, filed May 21, 1913. Application for reissue filed October 5, 1917. Serial No. 194,981.

*To all whom it may concern:*

Be it known that I, GEORGE L. MASON, a citizen of the United States of America, residing at Warehouse Point, in the county of Hartford and State of Connecticut, have invented new and useful Improvements in Trucks, of which the following is a specification.

This invention relates to an elevating truck. Devices of this kind are well-known in the art and comprise, in general, a three or four wheeled truck provided with a base and a platform capable of being raised or elevated away from the base in order that the truck may be wheeled underneath a load of paper, brick, or what not, upon a suitable support, the platform elevated, picking up the load, and the load then wheeled away. Trucks of this character heretofore manufactured, in so far as I have been aware, generally comprise a steering handle directly associated with the front wheel or wheels which are mounted upon the same axle and mechanism whereby, when the handle is pulled down, the platform may be elevated, but these devices have all been objectionable for the reason that, before the platform can be elevated, it has been necessary to point the handle substantially straight ahead.

In a truck constructed, on the other hand, according to my invention, the steering handle is preferably indirectly connected with the two front wheels which are all caster form and instead of being mounted upon the same axle, are turned on their vertical pivots in the lower platform or base portion of the truck. Moreover, the elevating mechanisms of my new and improved truck have been so constructed and arranged that it is entirely immaterial in what direction the handle happens to be pointing at the time it is depressed for raising the platform; the platform going up exactly as well whatever the position of the handle.

Trucks constructed according to the old practice, in so far as I am aware, have furthermore been objectionable and faulty on mechanical principle, for the reason that the elevating devices for the platform have been so arranged that they take their movement corresponding throughout to the depressing movement of the handle.

My invention, on the other hand, includes a construction and arrangement whereby the elevating devices go into action slowly, having a slight, and almost imperceptible, movement to correspond with the beginning of the depressing movement of the handle, which movement increases thereafter, as the handle is further depressed, thereby giving an "easy start." This makes the entire operation of the device correct on mechanical theory and much more efficient in practical operation.

Besides these features which I have been at pains to particularly point out as comprising important parts of my invention and which I consider both useful and broadly new, I desire at this point to call attention to another feature wherein my truck is both useful and novel. This relates to an automatic self-locking arrangement whereby the platform, by the construction and arrangement of the elevating devices themselves as distinguished from the operating mechanism therefor, is locked at closely consequent successive points throughout its entire lifting movement, the lift of the truck thereby resolving itself into a series of short lifts after each one of which the truck is locked in position and cannot be depressed by the load. This same mechanism operates in precisely the same manner when the truck is to be depressed, the lifting devices as they are operated to lower the truck automatically locking after each slight movement in a downward direction. This I consider broadly new.

Another important feature of the invention comprises the arrangement whereby I make use of two superposed and mutually engaging cams which means (from a practical standpoint) that I have been enabled to double the lift of the platform without materially increasing the minimum height of the platform from the floor. Another advantage inherent to the arrangement resides in the fact that the platform, while being raised has no longitudinal movement whatever relative to the lower platform but lifts by straight vertical lift as distinguished from the sliding lift of the trucks heretofore made.

Another feature of my invention resides in the construction and arrangement whereby without the use of pawl-and-ratchet mechanisms or their equivalents the handle may, if desired, be operated successively a plurality of times in the same vertical arc while raising a load on the platform. This is an important advantage, for my truck is especially designed to raise heavy loads, and the arrangement permits the operator to operate the handle a plurality of times in a substantially vertical position, thus giving him a "purchase" not possible were it necessary for him to raise the platform by following through one depressing movement of the handle from a substantially vertical to a substantially horizontal position. The advantage, moreover, is attained, as said above, without the employment of pawl-and-ratchet mechanisms or their equivalent or any other mechanism requiring attention on the part of the operator, but flows automatically from the nature of the lifting devices themselves. This I consider broadly new.

All these features which I have hereinabove briefly alluded to will be found fully detailed and emphasized in the accompanying specification.

In the drawings,—Figure 1 is a top, plan view of my improved truck. Fig. 2 is a side view. Fig. 3 is a longitudinal cross-section taken on the medial line of Fig. 1. Fig. 4 is a cross-section taken on the line 4—4 of Fig. 1. Fig. 5 is a cross-section taken on line 5—5 of Fig. 1; and Fig. 6 is a detail view on a larger scale illustrating the cam lifting device forming an important feature of my invention.

My truck comprises a frame and a platform A and B, frame A being supported upon the rear wheels $a$ and having swiveled front wheels $a'$. Platform B is adapted by mechanism hereinafter to be described to be raised from frame A and away from the same. Frame A carries brackets A′ by which it is supported from the axle of the rear wheels of the truck in an old and familiar manner. At the front end of frame A and integral therewith is a vertical bearing D carrying a sleeve member $d$ provided with a pair of arms $d'$ at its upper end and a downwardly-projecting integral segmental boss $d^2$ at its lower end. Between the arms $d'$ is mounted a shaft $d^3$ and on this shaft is, in turn, mounted a pair of toothed wheels $d^4$. Between the members $d'$ and the wheels $d^4$ and upon the shaft $d^3$ is carried upon bearings the U-shaped member $d^5$ carrying the pipe-handle $d^6$ equipped with a cross-rod $d^7$. Mounted in the pipe-handle $d^6$ is a spring-pressed plunger $d^8$ carrying at its lower end a cross-bar $d^9$ adapted to enter in and engage the slots of the toothed wheels $d^4$. Between these toothed wheels $d^4$ and rigid therewith is a pinion $d^{10}$ for coöperation with a cylindrical rack, and carried in the bearing $d$ is a cylindrical rack $d^{11}$ (of the nature of a screw but without pitch) as clearly shown in Fig. 3. Supported on a pair of brackets E depending from the frame A is a gear-wheel $e$ in mesh with the cylindrical rack $d^{11}$ and also with a pinion $e^2$ carried on a shaft $e^3$ mounted in brackets E′ at opposite sides of frame A. This shaft $e^3$ carries a pair of cams $e^4$, and upon shafts $e^5$ carried by depending lugs $E^2$ and $E^3$ of platform B are corresponding cams $e^6$ and $e^7$. The cams are shown in detail in Fig. 6. Each cam is provided with a flange $e^8$ corresponding to the contour of the cam, as clearly shown in Fig. 6, and between the two shafts $e^3$ and $e^5$ are mounted correspondingly a pair of vertical slotted members $e^9$ each carrying a pair of pins $e^{10}$, between which pins the flanges $e^8$ of the corresponding pair of cams are confined, all as clearly shown in Fig. 6. It is obvious that by this arrangement the cams $e^4$ and the cams $e^6$ are always held together in coöperative relation and it is impossible to remove platform B from frame A.

The mechanism illustrated in Fig. 6 is worthy of a detailed description. The cams $e^4$ are provided with a series of circular bosses $e^{40}$ while the cams $e^6$ are provided with a corresponding series of circular recesses $e^{60}$. Between these bosses $e^{40}$ are flat portions $e^{45}$, and between the circular recesses $e^{60}$ are flat portions $e^{65}$, these portions lying in the tangential plane of the cam at the points at which they occur. The result of this construction is that, as the cam $e^4$ is rotated, it correspondingly rotates the cam $e^6$ and as soon as any one projection $e^{40}$ passes the common vertical line of centers of the shafts $e^3$ and $e^5$, this boss automatically goes over to the position shown in Fig. 6, in which the two cams are shown as supported upon two bosses, in engagement with their corresponding recesses, the flat portions between the bosses and the recesses being parallel and traversing the common vertical line of centers of the two shafts $e^3$ and $e^5$. In other words, the action throughout the entire revolving contact of the two cams resolves itself into a succession of toggle motions, each projection $e^{40}$ lifting the cam $e^{60}$ and then, as it passes center, allowing the cam $e^{60}$ to go back slowly to a locked position. Exactly the same action takes place whatever the direction in which these cams are rotated. It will be thus clearly seen that, by this arrangement, the lift of the platform has been made self-locking not only in its extreme positions but at many positions intermediate its extreme positions and that this has been done not by the provision of separate means for the purpose, but by the very nature and construction of the lifting devices themselves.

Upon the shaft $e^3$, hereinabove alluded to, is a pinion $f$ engaged within a horizontal rack $f'$ (Fig. 4), which rack is confined to the pinion $f$ by an anti-friction roller $f^2$ carried on a depending web $f^3$ from frame A. The rack $f'$ engages at its other end a pinion $f^4$ secured to the rear axle $f^5$ of the truck. This rear axle is supported on bearings $f^6$ formed integrally with the frame A and carries wheels $a$. The rack $f'$ is held in contact with pinion $f^4$ by a roller $f^7$ carried on a web $f^8$ depending from frame A, as clearly shown on Fig. 5. Depending from platform B are a pair of brackets $g'$ and $g^2$ supporting a shaft $g^3$, which shaft carries cams $g^4$ coöperating with cams $g^5$ upon shaft $f^5$, precisely as the cams $e^4$ coöperate with the cams $e^6$ in the mechanism heretofore described. These cams $g^4$ and $g^5$ are provided also with a pair of slotted bars carrying pins precisely as illustrated in Fig. 6 and described in connection with the mechanism at the front end of the truck. Depending from the platform B are brackets B′ at either side of the rear ends thereof and brackets $E^3$ at either side of the front thereof. These brackets carry rollers $k'$ at the rear end and $k^2$ at the front end, which rollers are engaged in slots in the brackets A′ and E′ on frame A, in order to prevent the upper platform B from having longitudinal movement with respect to the lower frame A. Upon opposite sides of the front of the lower frame A are mounted by a well-known ball-bearing support, as shown in Fig. 2, casters H and H′ carrying the front wheels $a'$ of the truck. These casters are connected through the intermediary of lugs $h^3$ with radius rods $h^4$, which rods are, in turn, connected at their lower ends to depending circular boss $d^2$ on the member $d$. By this means, the truck may be steered by its handle $d^6$, radial movement of the handle $d^6$ in a horizontal direction being communicated through the bearing $d$ to the radius rods $h^4$ and thus to the individual casters on the front of the frame.

The operation of my new truck is as follows:—By operating the rod $d^8$ by means of its plunger, the cross-rod $d^9$ can be engaged with any one of the slots in the wheels $d^4$ and the pinion $d^{10}$, rigid therewith, thereby revolved. This pinion, whatever the position of the handle $d^6$, engages the cylindrical rack $d^{11}$, which, in turn, operates the pinion $e$ to in turn rotate the pinion $e^2$ upon the shaft $e^3$. The rotation of this shaft revolves cams $e^4$, which being provided with the projections $e^{40}$ taking into the recesses $e^{60}$ of the corresponding cams $e^6$, roll these cams. The result of this operation is to lift the platform by a series of steps, the lifting process being reduced to what is tantamount to a series of toggle actions and being automatically self-locked at many points throughout its duration. From an inspection of Fig. 6, it will be noted that the radial distance from the periphery of the cams $e^4$ and $e^6$ from their supporting shafts does not uniformly increase for equal angular increments of rotation of the shafts. For equal angular movements of the shaft the increment of increase of this radial distance becomes greater as the cams are turned from the position shown in Fig. 6. In other words, if the cams are turned through an angle of 30 degrees from the position shown in Fig. 6 a certain increment of separation of the shafts $e^3$ and $e^5$ is obtained and on a subsequent movement of 30 degrees another increment of separation is obtained. The latter increment is not, however, equal to the first but is somewhat greater and each of said increments gradually increases over the former increments. The lifting action is, thus, slow at the beginning and thereafter increases as the enlarged portions of the cams are brought to bear upon each other, which makes for an easy lift as explained hereinabove. Exactly the same elevating process, brought about through the same mechanism, is carried on meanwhile at the rear end of the truck through the intermediary of the rack $f'$, the pinion $f^4$, shaft $f^5$, and cams $g^4$ and $g^5$. The pins $e^{10}$ coöperate with the flanges $e^8$, thereby preventing (at both the front and rear ends of the truck) the top platform B from being lifted off the frame A, while the rollers $k'$ and $k^2$, being confined in vertical slots in the brackets A′ and E′, prevent longitudinal movement of the platform B.

It is to be particularly noted that the cross-bar $d^9$ may at any time be shifted from one pair of alined slots in the wheels $d^4$ to another, thus enabling the operator to raise the platform by a series of short pumping operations in which the handle plays in the same small arc. This is an important advantage where heavy loads are to be raised.

Having now described my invention, but recognizing that it is not to be confined to the precise structure I have chosen by which to illustrate it, but that, on the other hand, many modifications and departures from this precise structure are possible within the scope of the invention which is more truly bounded and defined by the claims hereto appended, I claim,—

1. In a lifting truck, a base, a swivel mounted in said base, a cylindrical rack carried by the swivel, a steering handle carried by the swivel, and means associated with the handle for the operation of the rack.

2. In a device of the class described, including a frame, a movable platform, a swivel on the frame, a columnar rack carried by the swivel, a pinion mounted in the swivel, a steering handle connected to the swivel, and means associated with the handle independently movable thereon at the will of the operator and arranged to operate said pinion together with means for elevating the platform adapted to be operated by the rack.

3. In an elevating truck, including a movable platform, a frame and means to elevate the platform from the frame, a swivel mounted in the latter, a steering handle connected to the swivel, a vertically movable power transmitting member mounted in said swivel, a device to elevate the same, operative connections between said member and said platform elevating means, and means associated with the steering handle operable at the will of the operator to actuate said device, whereby said platform may be elevated.

4. A lifting truck, comprising, in combination, a frame, a movable platform, a plurality of cams rotatably mounted on the frame, a plurality of cams rotatably mounted on the platform and engageable with the first named cams, whereby a series of lifting devices arranged in pairs is provided, and means operable to turn one cam of each pair, one cam of each pair having its periphery formed with a series of spaced recesses, the other cam of each pair having its periphery formed with a series of spaced projections engageable in said recesses, whereby one cam of each pair may be rotated by the other, all constructed and arranged so that normally two projections of one cam engage with two recesses of the mating cams on opposite sides of the line of centers of a pair of cams and so that as any projection with its mating recess crosses said line of centers, the said centers are forced farther apart than immediately before or after such positioning, whereby the lifting motion is resolved into a series of self locking increments.

5. A lifting truck, comprising, in combination, a wheeled frame, a movable platform, a plurality of cams carried by the frame, a plurality of cams carried by the platform and engageable with the first named cams, whereby a series of lifting devices arranged in pairs is provided, a steering handle mounted on the frame, and means operable from said handle to turn one cam of each pair, one cam of each pair having its periphery formed with a series of spaced recesses, the other cam of each pair having its periphery formed with a series of spaced projections engageable in said recesses, whereby one cam of each pair may be rotated by the other, all constructed and arranged so that normally two projections of one cam engage with two recesses of the mating cam on opposite sides of the line of centers of a pair of cams and so that as any projection with its mating recess crosses said line of centers, the said centers are forced farther apart than immediately before or after such positioning, whereby the lifting motion is resolved into a series of self locking increments.

6. A lifting truck, comprising, in combination, a base portion, a lifting platform, a steering handle swiveled in the base portion, lifting devices arranged between the platform and base portion, each device comprising a pair of separate but mutually engaged rotatable members, operative connections between said devices and said handle, whereby upon depression of the latter the lifting devices may be actuated to lift the platform, one member of each pair having its periphery formed with a series of spaced recesses, the other member of each pair having its periphery formed with a series of spaced projections engageable in said recesses, whereby one member of each pair may be rotated by the other, all constructed and arranged so that normally two projections of one member engage with two recesses of the mating member on opposite sides of the line of centers of a pair of members and so that as any projection with its mating recess crosses said line of centers, the said centers are forced farther apart than immediately before or after such positioning, whereby the lifting motion is resolved into a series of self locking increments.

7. A lifting truck, comprising, in combination, a wheeled frame, a movable platform, a swivel on the frame, a cylindrical rack carried by the swivel, a pinion mounted in the swivel and engaged with the rack, a steering handle connected to the swivel, means associated with the handle independently movable therein at the will of the operator and arranged to operate said pinion, lifting devices between the frame and platform, each device comprising, a pair of separate but mutually engaged members, and means operable from said rack to actuate one member of each pair, one member of each pair having its periphery formed with a series of spaced recesses, the other member of each pair having its periphery formed with a series of spaced projections engageable in said recesses, whereby one member of each pair may be rotated by the other, all constructed and arranged so that normally two projections of one member engage with two recesses of the mating member on opposite sides of the line of centers of a pair of members and so that as any projection with its mating recess crosses said line of centers, the said centers are forced farther apart than immediately before or after such positioning, whereby the lifting motion is resolved into a series of self locking increments.

8. In an elevating truck, the combination with a frame and supporting and steering wheels, of a steering swivel, a steering handle fulcrumed upon said swivel, elevating mechanism on said frame and means for operating said elevating mechanism from said handle, comprising a member movable for this purpose in the line of the axis of said swivel.

9. In an elevating truck, the combination with a frame and supporting and steering wheels, of a steering swivel, a steering handle fulcrumed upon said swivel, elevating mechanism on said frame and means for operating said elevating mechanism from said handle in any steering position of said handle, comprising individually rigid power-transmitting parts located respectively on said swivel and said frame, said parts being relatively movable laterally and having a swiveling connection coaxial with said steering swivel.

10. In an elevating truck, the combination with a frame and supporting and steering wheels, of a steering swivel, a steering handle fulcrumed upon said swivel, elevating mechanism on said frame and means for operating said elevating mechanism from said handle comprising a member connected with said handle and movable by the handle both in its steering and in its swinging movements, a second member pivoted on the frame, and a positive connection between said members upon which one member is movable relatively to the other about the axis of said swivel, said connection being arranged to reciprocate in the line of said axis.

11. In an elevating truck, the combination with a frame and supporting and steering wheels, of a steering swivel, a steering handle fulcrumed upon said swivel, elevating mechanism on said frame and means for operating said elevating mechanism from said handle comprising a member connected with said handle and movable by the handle both in its steering and in its swinging movements, a second member pivoted on the frame, and a constant positive connection between said members upon which one member is movable relatively to the other about the axis of said swivel, said connection being arranged to reciprocate in the line of said axis.

12. In an elevating truck, the combination with a frame and supporting and steering wheels, of a steering swivel at the front of said frame, a steering handle pivotally connected to said swivel, and elevating mechanism comprising a member pivoted on said frame and having a connection to said handle comprising a member movable in the line of the axis of said swivel, said connection having provision for relative movement of said handle and said pivoted member about the axis of said swivel.

13. In an elevating truck, the combination with a frame and supporting and steering wheels, of a steering swivel at the front of said frame, a steering handle fulcrumed upon said swivel, and elevating mechanism comprising a member pivoted on said frame and a connection between said handle and said member by which a movement of said handle in either direction about its fulcrum may be transmitted to said member, said connection having a joint coaxial with said swivel whereby said handle may operate said elevating mechanism in any position of said handle.

14. In an elevating truck, in combination with the truck frame and the supporting and steering wheels, a steering handle, a steering swivel upon which said handle is fulcrumed, and elevating mechanism comprising a member pivoted upon said frame and having a connection to said handle comprising a part movable in the line of the axis of said swivel, said member and said handle being relatively movable upon said connection about said axis.

15. In an elevating truck, the combination with a frame and supporting and steering wheels, of a steering swivel, a steering handle fulcrumed on said swivel, elevating mechanism comprising a movable member mounted on the frame, and means for positively transmitting the movements of the handle about its fulcrum to said movable member without transmitting the steering movements of said handle, said means comprising a connection having provision for a swiveling relative movement of said members about the axis of said swivel.

16. In an elevating truck, the combination with a frame and supporting and steering wheels, of a steering swivel, a steering handle fulcrumed on said swivel, elevating mechanism comprising a movable member mounted on the frame, and means for positively transmitting the movements of the handle about its fulcrum to said movable member without transmitting the steering movements of said handle, said means comprising a part arranged to transmit the power applied to said handle along the axis of said swivel and about which said members are relatively movable on said axis.

17. In a lifting truck comprising a base portion and a lifting platform, a swivel in said base portion, a handle connected to the swivel, a power transmitting device mounted to operate in the axis of the swivel, and means associated with the handle to operate the power transmitting device, the whole being so organized and arranged that the lifting function may be effected whatever the position of the handle in a horizontal plane.

GEORGE L. MASON.

Witness:
C. T. NEAL.